12) United States Patent
DePizzol

(10) Patent No.: US 11,830,057 B2
(45) Date of Patent: *Nov. 28, 2023

(54) METHOD, MEDIUM, AND SYSTEM FOR UPGRADE RECOMMENDATIONS FOR VIRTUAL SHOPPING CART

(71) Applicant: SONY INTERACTIVE ENTERTAINMENT LLC, San Mateo, CA (US)

(72) Inventor: Christopher DePizzol, Alameda, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 207 days.

This patent is subject to a terminal disclaimer.

(21) Appl. No.: 17/242,009

(22) Filed: Apr. 27, 2021

(65) Prior Publication Data

US 2021/0248663 A1 Aug. 12, 2021

Related U.S. Application Data

(63) Continuation of application No. 15/799,904, filed on Oct. 31, 2017, now Pat. No. 10,991,027.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0627* (2013.01); *G06Q 30/0633* (2013.01); *G06Q 30/0641* (2013.01)

(58) Field of Classification Search
CPC .......... G06Q 30/0631; G06Q 30/0627; G06Q 30/0633; G06Q 30/0641
See application file for complete search history.

(56) References Cited

U.S. PATENT DOCUMENTS 7,386,485 B1 * 6/2008 Mussman ............. G06Q 30/02
705/14.1
8,825,672 B1 * 9/2014 Bilger ................ G06Q 30/0631
707/758

(Continued)

OTHER PUBLICATIONS

Linden, Greg, Brent Smith, and Jeremy York. "Amazon. com recommendations: Item-to-item collaborative filtering." IEEE Internet computing 7.1 (2003): 76-80.—teaches collaborative filtering (Year: 2003).*

(Continued)

*Primary Examiner* — Matthew E Zimmerman
(74) *Attorney, Agent, or Firm* — POLSINELLI LLP

(57) ABSTRACT

The subject disclosure relates systems and methods for making upgrade recommendations, such as recommendations for version upgrades to a purchasable media-content item. A process of implementing the subject technology can include steps for authenticating a user associated, identifying affiliates of the user, wherein the affiliates are associated with the user via a social network or online gaming platform, receiving a user selection of a content item, and identifying an upgrade version of the content item, wherein the upgrade version is associated with a second version identifier and a second price indicator. In some aspects, the process can further include steps for providing a recommendation to the user, wherein the recommendation indicates the upgrade version of the content item and the second price indicator. Systems and machine-readable media are also provided.

21 Claims, 7 Drawing Sheets

(56) References Cited

U.S. PATENT DOCUMENTS

| | | | | |
|---|---|---|---|---|
| 9,189,811 B1* | 11/2015 | Bhosle | ............... | G06Q 30/0641 |
| 10,832,304 B2* | 11/2020 | Feierfeil | ............ | G06Q 30/0643 |
| 10,991,027 B2 | 4/2021 | DePizzol | | |
| 2013/0191241 A1* | 7/2013 | Fillipi | .................... | G06Q 30/02 |
| | | | | 705/26.7 |
| 2018/0005141 A1* | 1/2018 | Vasvani | ................. | G06Q 10/02 |

OTHER PUBLICATIONS

Goldsten, Dan, and Yuchun Lee. "The rise of right-time marketing." Journal of Database Marketing & Customer Strategy Management 12.3 (2005): 212-225.
U.S. Appl. No. 15/799,904 Final Office Action dated Sep. 8, 2020.
U.S. Appl. No. 15/799,904 Office Action dated Jan. 31, 2020.

* cited by examiner

METHOD, MEDIUM, AND SYSTEM FOR UPGRADE RECOMMENDATIONS FOR VIRTUAL SHOPPING CART

CROSS-REFERENCE TO RELATED APPLICATION

The present application is a continuation and claims the priority benefit of U.S. patent application Ser. No. 15/799,904 filed Oct. 31, 2017, now U.S. Pat. No. 10,991,027, which is incorporated herein by reference in its entirety.

BACKGROUND

1. Technical Field

Aspects of the subject technology relate to ways to provide user product recommendations and in particular, to provide upgrade recommendations for a virtual shopping cart item that has been selected for checkout.

2. Introduction

Rapid growth of the Internet and the consequential proliferation of online gaming systems have resulted in significant changes in the number and type of collaborative activities with which online users engage. In addition to online games, vendors provide music, movies, social networking streams and other media for consumption via specialized applications (e.g., "apps") executed on a personal computing platform, such as a console system, personal computer, smartphone, and/or tablet device, etc. To increase media consumption, content distributors, such as Netflix have an incentive to provide targeted recommendations for additional content items that may be of interest to the user.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
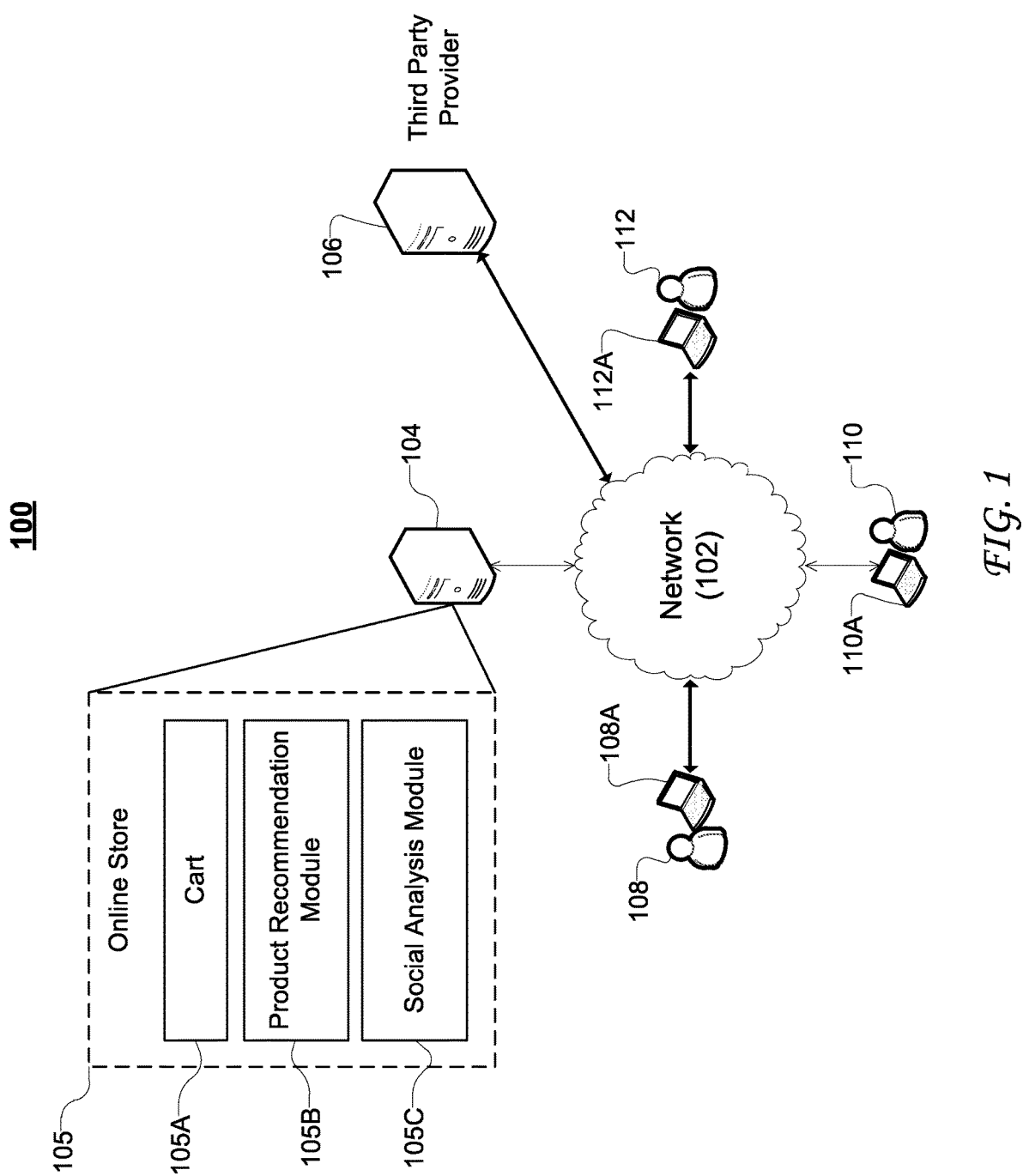
FIG. 1 illustrates an example environment in which some aspects of the technology can be implemented.

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

When shopping online (e.g., at e-commerce or media content provider websites), customers typically add items to a virtual "shopping cart" that provides a series of menu items for adding or removing items, and/or selecting a payment method and checking out. In some conventional implementations, different items can be suggested to the user during the checkout process, for example, that may be based on previous item selections. For example, a user that has placed a clothing item in his/her online shopping cart, such as a t-shirt, may be provided with a suggestion for a different product, such as a hat, e.g., from the same product category i.e., clothing. Conventionally, product recommendations are selected based on general product categories (e.g., "clothing"), or based on what other unrelated or unaffiliated shoppers had previously purchased. For example, conventional recommendation methods may identify unrelated items that were also purchased by shoppers that also purchased a t-shirt.

An increasing number of online transactions are being performed for downloadable content items, such as movies, music, software, and video games. Such transactions routinely involve the purchase of a license for a particular media content item, for example, that gives the user certain permissions with respect to the use of the content item. In such instances, multiple "versions" of the same product may be available, but that offer access to different features or permissions at different price points.

By way of example, for video game purchases, certain features may be version specific, with fewer features offered at a lower price point, and a greater number of features available at higher price points. The packaging of features for a content item, such as a video game, can include any type of item, access availability, or player mode that can be packaged with the content item. By way of example, video game features may include various items that are made available during gameplay (e.g., virtual objects, players, and/or accessibility of levels or maps, etc.). Features can also include access rights that are exercisable in conjunction with the content item, such as, the ability to engage in multiplayer play, access to certain competitive environments (e.g., a game tournament or special map), and/or the availability of different difficulty modes. In some aspects, additional features can include a "season pass" that, when purchased, provides the user with access to all possible game expansions and/or to other exclusive content not otherwise available with the content item purchase. Season passes can confer various access rights for a predetermined time period, such as for a six-month or one-year period from a time of purchase. In other approaches, a season pass may provide expanded access to game features and/or other exclusive content up until a specified future date. It is understood that the access rights and duration of a season pass can vary depending on the content item and desired implementation.

For the purchase of content items that have multiple versions, it would be desirable to make upgrade recommendations, for example, that provide user suggestions based on game features the user is likely to enjoy. Such suggestions can help the user to choose a version that will best suite their specific use of the content, such as, by enabling them to engage in social or competitive play with online peers, acquaintances or friends that are known to have purchased the same version of the content item. By way of example, a video game have a "basic" version that permits independent (single) user play, and an "upgraded" version that permits gameplay in a collaborative multiplayer environment. If online friends of a purchasing user have purchased the upgraded version, it is likely that the user would be interested in purchasing the upgraded version as well, for example, so that he can participate in gameplay with the online community.

Aspects of the subject technology address the foregoing need by providing systems and methods for selecting and providing product and/or version upgrade recommendations to user during the online checkout process. Recommendations can be made based on a likelihood that the purchasing user will want additional features provided in one or more upgraded versions. Recommendations can also be made based on social graph information, such as, by referencing a user's online relationship to other users/consumers, as well as their respective purchase histories. As discussed in further detail below, upgrade recommendations can be made by providing one or more interstitial displays during the checkout process that enable the user to conveniently compare different content item versions, and to easily select an upgraded version for purchase.

FIG. 1 illustrates an example environment 100 in which an online store can be used to provide version upgrade recommendations. Environment 100 includes network 102, that permits communication between a media-delivery system 104, a third-party provider 106, and users 108, 110, and 112, e.g., via respective computing devices 108A, 110A, and 112A. Store 105 contains a cart module 105A, a product recommendation module 105B, and a social analysis module 105C that provide the functionality, including displays and user selectable options, necessary to identify and display upgrade recommendations, according to some aspects of the technology.

It is understood that the architecture of environment 100 is intended to conceptually illustrate various functional components that can be used to provide an online shopping environment. However, a greater or fewer number of hardware and/or software components can be implemented. For example, media-delivery system 104 could include multiple computing devices (e.g., servers), as part of a network (e.g., an online gaming network), or as part of a distributed computing system, such as a cloud data-center. Users/ players 108, 110, and 112, are intended to help illustrate aspects of the technology that relate to a multi-user, multiplayer environment, as well as various other social networking aspects. However, a greater number of users or players may be included, without departing from the scope of the technology. Additionally, online store 105 is intended to conceptually illustrate various systems and software components (modules) that could be used to implement various product/version upgrade recommendations of the technology. However, such implementations could be performed using additional systems or software, such as one or more databases or content item repositories.

Media-delivery system 104 can be configured to facilitate the purchase and delivery of various media content items, such as video games, movies, music, TV shows, or applications ("apps"), etc. In some aspects, content items are provided to media-delivery system by a third-party 106, such as a game-developer, or studio, etc. Content items made available by media-delivery system 104 can be provided to any customer, user, or player, with access to media-delivery system 104, such as via a game-console system, personal computer, and/or portable device, such as a tablet computer or smartphone device, etc.

Purchase of media-content items is required before user access to various content items is permitted. For example, purchased media-content items can be made available for user download, and/or accessible via an online system, such as media-delivery system 104, or another online server such as a gaming server or online gaming platform (not illustrated). Purchase of one or more content items can be facilitated by online store 105 that includes several modules, including cart 105A, product recommendation module 105B, and social analysis module 105C.

Cart 105A can provide the logic and user interfaces necessary to display various content items and to make the items selectable and purchasable through online store 105. By way of example, cart 105A can provide payment and billing functionality necessary to accept, process and store customer payment information, such as credit card or online payment account information. Cart 105A also provides persistent shopping functionality, whereby selected items can be persistently stored in cart 105A even if the user browses away from online store 105.

Product recommendation module 105B can provide processing and logic necessary to make potential product recommendations to a user, such as, product and/or version upgrade recommendations. Social analysis module 105C provides information regarding social affiliations of a user/ customer, such as indications of online connections or relationships with other customers of online store 105. As discussed in further detail below, acting in conjunction with social analysis module 105C, product recommendation module 105B can provide product upgrade recommendations to a user that are based on a variety of factors, including information about online acquaintances of the user.

In practice, product recommendation module 105B is configured to identify and select product upgrades to be recommended during checkout. Product recommendation module 105B may use information about a product selected for purchase, to determine what upgrade suggestion/s should be provided. For example, product recommendation module 105B can be configured to determine all product versions of a product placed in cart 105A, and to provide user recommendations regarding one or more upgrade options e.g., identifying the availability of upgraded versions.

Product recommendation module 105B can work in conjunction with social analysis module 105C, and upgrade recommendations can be based on purchase history information for one or more online friends or connections of the purchasing user. By way of example, user 108 may view various video game titles available via media-delivery system 104, using user device 108A, such as a game-console system. Upon selection of a particular title offered in online store 105, product recommendation module 105B can search additional items available through online store 105 to identify any potential product upgrades available for the selected title. For example, if user 108 selects a "basic" version of a video game, but additional upgrades are available, such as, a "gold edition" and a "deluxe edition", each of the additional items may be returned by product recommendation module 105B, and offered to the user as potential product upgrades, before the checkout and payment process is completed.

In some aspects, product upgrade recommendations can be based on a purchase selection frequency for a particular upgrade version. That is, where multiple upgrade recommendations are available, upgrade recommendations may be selected based on a highest frequency of purchase by other users/customers of online store 105. Further to the above example, if the "gold edition" is the most frequently purchased from online store 105, product recommendation module may only provide an upgrade recommendation for the "gold edition," or alternatively, may prioritize a recommendation for the "gold edition," relative to a recommendation for the "deluxe edition."

Social analysis module 105C can be used to enhance upgrade recommendations that are provided by product recommendation module 105B. Further to the above example, if social analysis module 105C determines that users 110 and 112 are social acquaintances of user 108, then the upgrade recommendations can be based on a purchase history of users 110 and 112. For example, if users 110 and 112 have each purchased the "deluxe edition" of the content item, then the upgrade recommendation may only provide a recommendation for the "deluxe edition" of the content item. Alternatively, the provided upgrade recommendation may indicate multiple available upgrade options, but may visually prioritize or indicate a version that was purchased acquaintances of user 108.

In some aspects, game version information may be of particular relevance to the consumer. For example, where certain multiplayer and interactive features are only available with certain version of an offered content item, the purchasing user may be especially interested in buying an upgraded version that will enable him to interact with social networking affiliates that play the same game. Further to the above example, if the "basic" version of the content item is one that does not permit interactive game-play, then an upgrade recommendation indicating what versions (or above what versions) user 108 must purchase may be particularly relevant to the user. That is, an indication that user 108 must purchase at least the "gold edition" in order to play with users 110 and 112 could be helpful in the user's final purchase decision.

As discussed in further detail below, version upgrade recommendations can be provided using interstitial displays delivered by online store 105 to a user device (e.g., user device 108A) of the purchasing user. Through the use of interstitial displays, selected product or version upgrades can be seamlessly replaced in cart 105A, so that the checkout process can be completed using online store 105, without the need for the customer to perform steps to separately remove and/or add different content items to cart 105A.

Figure 2:
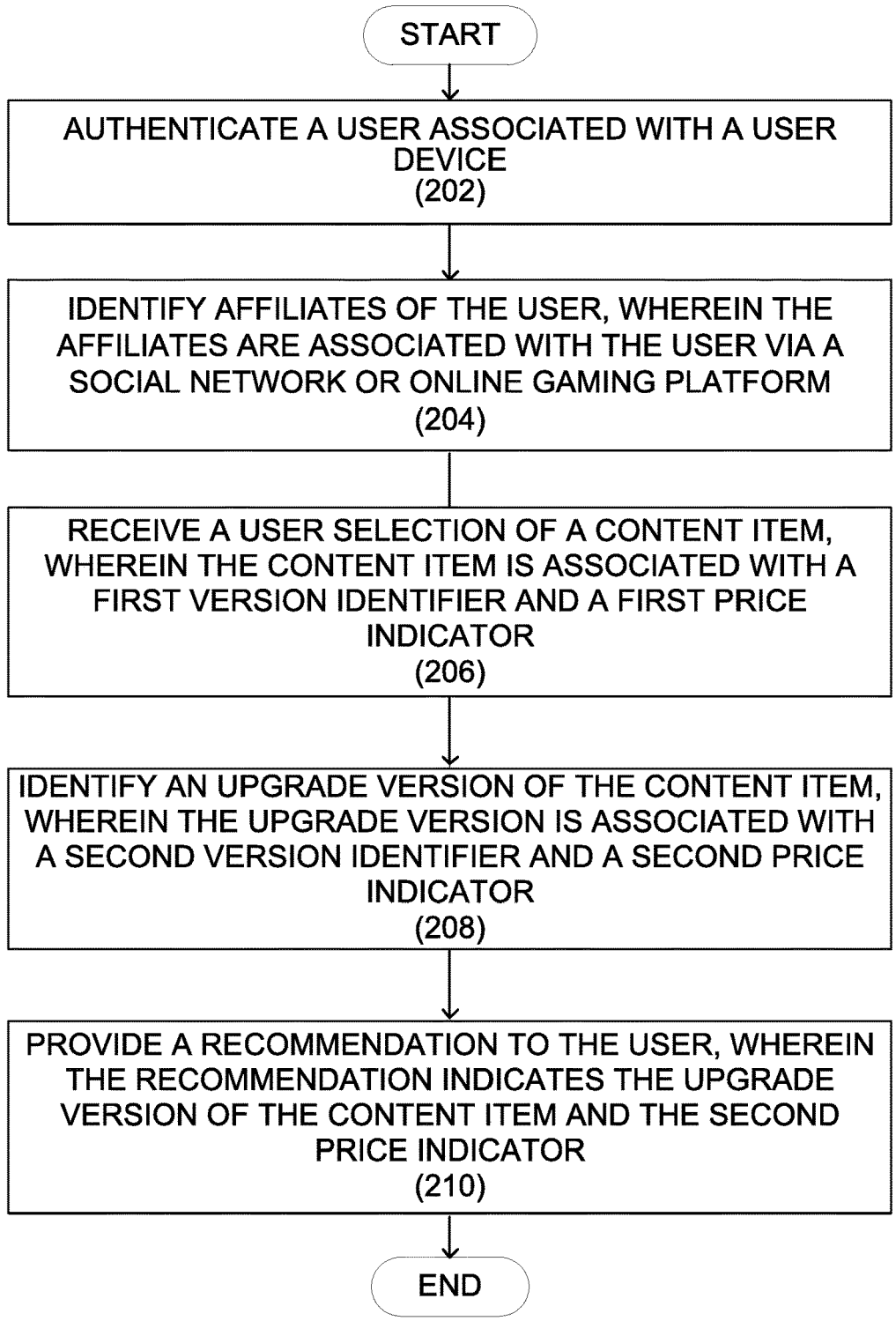
FIG. 2 illustrates steps of an example process for providing version upgrade recommendations, according to some aspects of the technology.

FIG. 2 illustrates an example process 200 for providing product upgrade recommendations, according to some aspects of the technology. Process 200 begins with step 202 in which a user is authenticated, for example, by an online store, such as online store 105. Authentication of the user can be accomplished through the verification of user provided credentials, such as a username, email address and/or password. In some aspects, a device associated with the user (e.g., a game console system) may include authentication information that is seamlessly authenticated by the online store. User authentication can be used to link an online account of the user with payment information, such as credit card information, or a store credit account.

In step 204, one or more affiliates of the user can be identified. User affiliates (e.g., social networking 'friends' or online acquaintances) can include social networking acquaintances of the user, such as, affiliates in an online gaming platform, such as the PlayStation™ Network. User affiliates can also include third-party social networking affiliates of the user, such as those associated with the user on a Facebook, Instagram, and/or Snapchat account, etc.

In step 206, user selection of a content item is received. Content item selection can be performed using one or more input devices associated with the device used to access the online store. Selection of a content item (e.g., a game title, movie, album, song and/or app), can cause the item to be placed in a persistent virtual cart, such as cart 105A discussed above with respect to FIG. 1. In some aspects, selection of a content item can cause the store to provide one or more interstitial displays to the user, for example, that provide information regarding additional details or features related to the content item. In some aspects, version a price information associated with the content item are displayed, for example based metadata including a version identifier (e.g., a first version identifier), and a price indicator (e.g., a first price indicator).

In step 208, one or more upgrade versions of the content item are identified. Identification of upgrade versions can be performed using the version identifier information associated with the content item, as described in step 206. For example, if the content item is a video game, other game versions or content offerings may be identified by using the version identifier associated with the selected video game version. If the content item is a movie, other release versions may be identified, for example, that provide different types of content, such as a director's cut or special feature content. Version identifiers may correspond with certain product labels indicated by designations such "Standard Edition," "Gold Edition," or "Deluxe Edition," etc.

In some aspects, identification of upgrade versions of the content item may be based on past purchases or a play history of the user, of other customers of the online store, and/or of one or more affiliates of the user, as identified in step 204. If multiple upgrade versions are available, preference may be given to those versions that have been previously purchased or played by user, frequently purchased or played by other online customers, and/or the user's online affiliates. By way of example, if the content item is a video game, and certain multiplayer features are only available in a particular upgraded version of the game, then the purchasing user may be interested in knowing which version was purchased by their friends/affiliates.

In step 210, a recommendation is provided to the user. In some embodiments, the recommendation can indicate one or more upgrade versions of the content item. The recommendation can include a second price indicator, for example, that is different from the first price indicator. Although the second price indicator may be higher or lower than the first price indicator, where the recommended upgrade version contains more features or options, the second price indicator may be higher than the first price indicator.

In some aspects, multiple upgrade versions may be provided (displayed) concurrently. In some aspects, upgrade versions may be accompanied by side-by-side feature comparisons, for example, to help the user to better understand what options are available at different price points. As discussed above, where multiple upgrade versions are available, recommendations for certain upgrade recommendations may be prioritized based on a frequency of purchase by all customers, or based on social networking information the purchasing user's online affiliates, such as, purchase history information for one or more of the user's gaming friends.

As discussed in further detail below, the recommendation can be indicated using one or more interstitial displays provided to the user during the online checkout process. Such displays can be configured to accept indications of the user's desire to swap items in an online cart. For example, upgrade recommendation displays can be configured to accept inputs indicating that the user wishes to purchase an upgraded version of a content item. Such indications may cause the upgraded version to be seamlessly replaced in the online shopping cart, without the need for the user to remove the originally selected item.

Figure 3A:
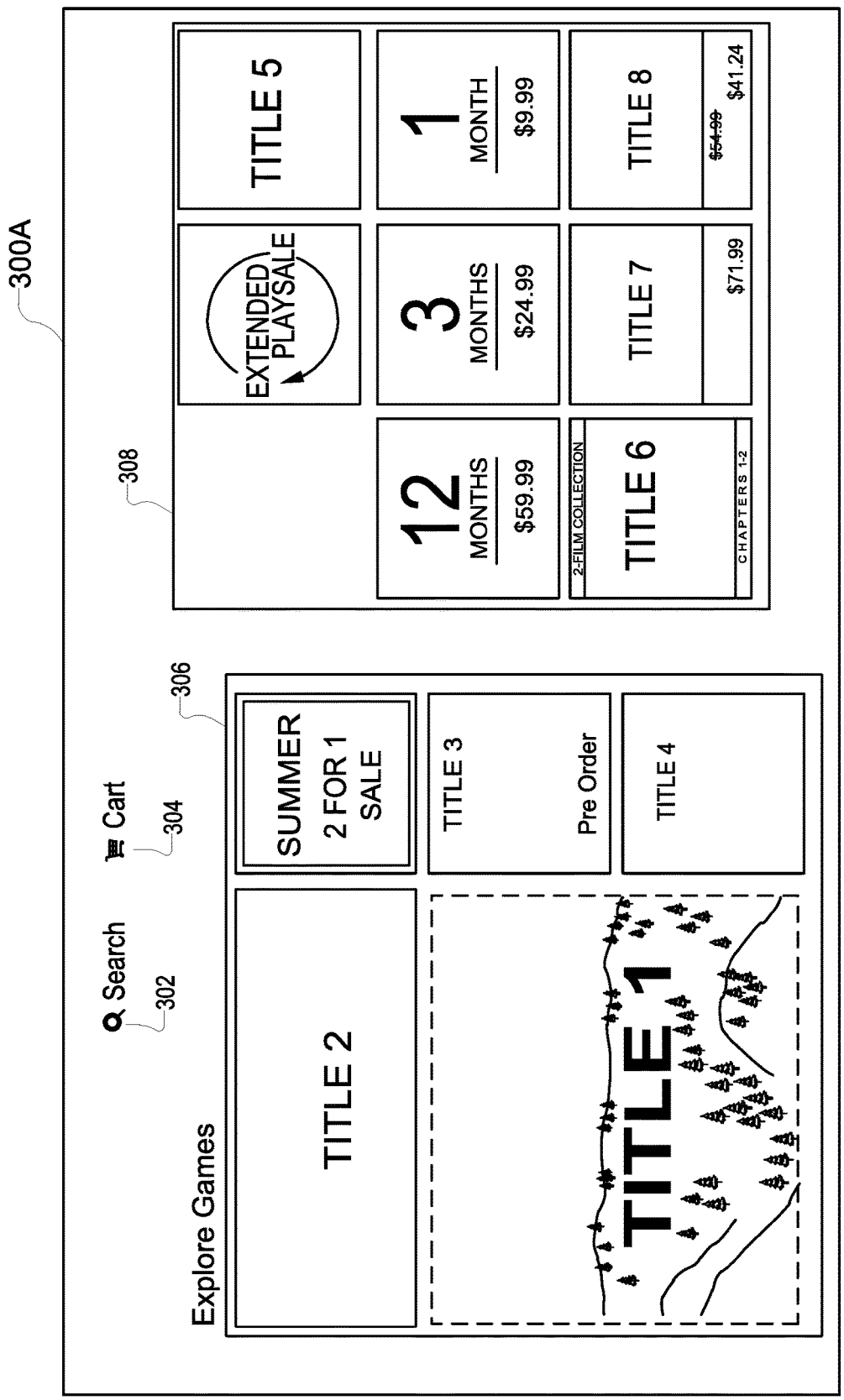
FIGS. 3A-3C illustrate graphical displays that can be used to provide a user with an upgrade recommendation, according to some aspects of the technology.

FIG. 3A illustrates an example graphical display 300A of an online store that provides selectable user options to facilitate the purchase of content items. Purchasable content items can include any type of downloadable media content, such as movies, music, games, and/or software (such as apps), etc. Graphical display 300A is displayed by a user device associated with a user or customer of the online store. For example, graphical display 300A can be provided for display by a game console system, personal computer (PC), smartphone, tablet computer, or other mobile device associated with the user.

Graphical display 300A includes selectable icons that provide various user-selectable options relating to the search and selection of content items, e.g., for rent or for purchase. In the illustrated example, graphical display 300A includes search icon 302, cart icon 304, and item-explorer displays 306, 308. Search icon 302 provides a selectable option to initiate a product search. For example, search icon 302 can be selected by a user, via a user-device (e.g., a console game system), to initiate a search for various content items, such as video games. Cart icon can provide a selectable user option to facilitate access to an online shopping cart, for example, that displays one or more items that the user has selected to purchase. In some aspects, the shopping cart accessible via cart icon 304 can be a persistent shopping cart that is configured to retain one or more items selected in the online store or catalog during previous browsing sessions.

Item-explorer displays 306, 308 provide graphical displays of various items and purchase options available within the online store. Item-explorer display 306 indicates multiple content item titles available for rent, subscription and/or purchase. For example, item-explorer display 306 contains Title 1, Title 2, Title 3, and Title 4 representing media content items that can be purchased for download, such as video games, movies, television series, etc. Item-explorer display 306 can also indicate options to display promotions available through the online store, such as, an icon providing access to "2 for 1" sale items on promotion during an indicated time-period, such as a season (summer). Similarly, item-explorer display 308 provides icons that indicating various offers for different content items.

In the illustrated example, item-explorer display 308 provides icons provides icons to facilitate access to content items that are part of an "extended play sale" or for content item rent options, e.g., for different time periods, such as, 12 months, 3 months, or 1 month. Icons representing content item titles can also provide price information, indications of recent price changes, and/or sale information for content item bundles (e.g., a "2-film collection"). It is understood that item-explorer displays 306, 308 could provide virtually any type of information relating to the sale of content items or content item bundles, without departing from the scope of the invention. In some aspects, a user can make a selection of one or more content items displayed in item-explorer displays 306, 308, for example, to add the selected title to an online shopping cart. In the illustrated example, Title 1, is selected, e.g., by a user associated with a client device.

Figure 3B:
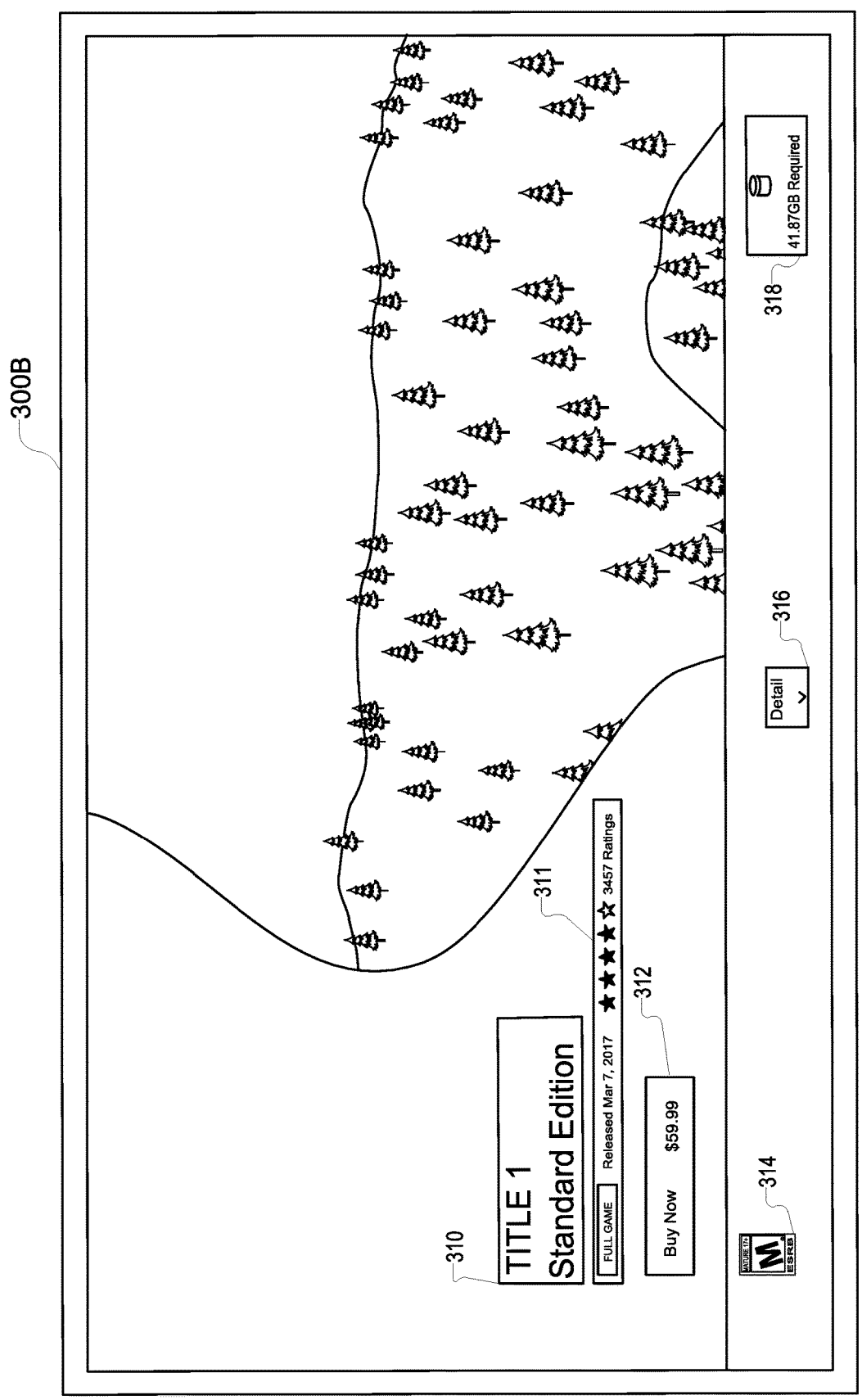

FIG. 3B illustrates an example display that is provided after selection of Title 1 in graphical display 300A. That is, FIG. 3B illustrates graphical display 300B, that provides additional information regarding the selected content item, i.e., Title 1. Graphical display 300B includes various information items, such as, information displays 310, 311, 312, 314, 316, and 318 that provide additional information with respect to the selected content item (Title 1). Information display 310 provides an indication of the title (e.g., "Title 1"), as well as a version associated with the selected item e.g., "standard edition." Information display 311 indicates the sales offer (e.g., "full game"), release date information (e.g., Mar. 7, 2017), and a user rating. Information display 312 indicates a price option (e.g., "$59.99") should the user wish to continue with purchase and "Buy Now." Information displays 314, 316, and 318, can provide additional information including a maturity rating, a selectable option for further detail expansions, and an indication of space required for the content-item download of Title 1, respectively. It is understood that different information displays may be used to indicate other aspects or characteristics of a selected content item, without departing from the scope of the invention.

Figure 3C:
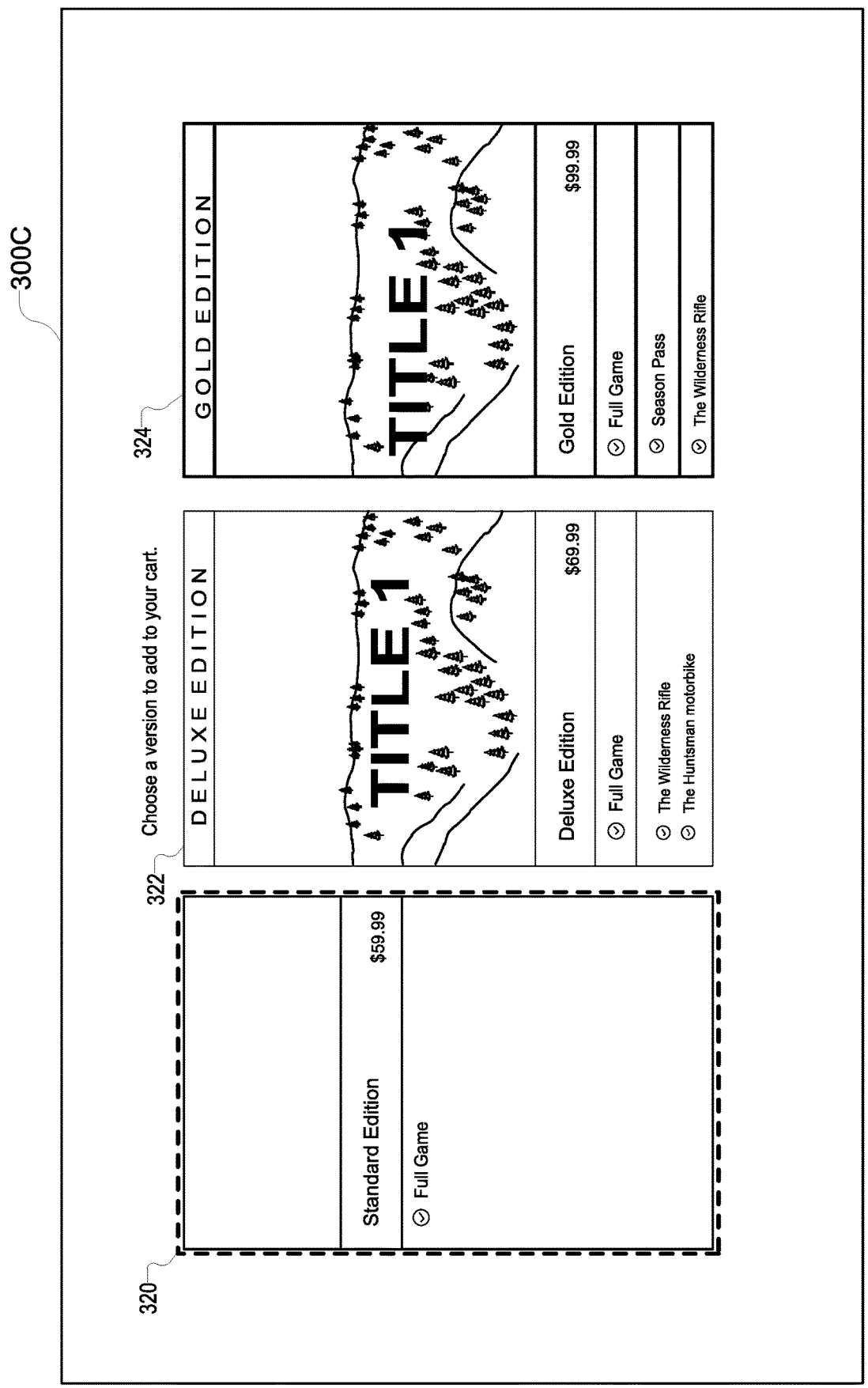

FIG. 3C illustrates an example display 300C provided after selection of the "Buy Now" option for Title 1, provided in graphical display 300B. In particular, display 300C illustrates an example of an interstitial upgrade offer (i.e., an upgrade recommendation) provided with respect to a selected content item, e.g., Title 1. As discussed above with respect to process 200, upgrade options (e.g., for one or more upgrade versions of a selected content item) can be identified and provided by the online store prior to final customer payment. The upgrade recommendation provided by display 300C can provide an opportunity for the customer to upgrade the features of a content item that has been selected for purchase. In some embodiments, the upgrade recommendation can provide useful information to the user in order to facilitate a decision regarding what content item version should be purchased.

Display 300C includes purchase options 320, 322, and 324, each of which provide the user with the ability to purchase different versions of the selected item, e.g., Title 1. Various versions of a content item can include different numbers or types of features available for a particular version type. Further to the example illustrated with respect to FIG. 3C, each purchase option is associated with a respective version identifier corresponding with a different version of the selected content item, e.g., a "Standard Edition" 320, a "Deluxe Edition" 322, or a "Gold Edition 324," each of which have a respective price indicator. In the illustrated example, the "Deluxe Edition," provided by purchase option 322, is offered at a price of $69.99, whereas the "Gold Edition," provided by purchase option 324, is offered at a price of $99.99.

As discussed above, each version of the selected content item can include different features or user permissions, some or all of which can also be detailed using the provided purchase options. For example, purchase option 320 indicates that the "Standard Edition" includes the full game of the selected content item. Purchase option 322 indicates that the "Deluxe Edition" includes the full game, in addition to certain add-ons, e.g., "The Wilderness Rifle," and "The Huntsman motorbike." Similarly, purchase option 324 indicates that the "Gold Edition" includes the full game, in addition to a "Season Pass," and "The Wilderness Rifle." It is understood that a greater or fewer number of purchase options may be displayed, and that features associated with any particular version can vary by content item, and on the desired implementation.

As discussed above, the upgrade versions indicated by the various purchase options can be selected based on various types of information about the user, such as past browsing or purchase history information and/or social network information. By way of example, identification of upgrade versions of the content item may be based on past purchases or a play history of the user. Additionally, identification of upgrade versions of the content item may be based on one or more online (social) affiliates of the user. If multiple upgrade versions of a content item are available, preference may be given to those versions that have been previously purchased or played by the user's online affiliates. By way of example, if the content item is a video game, and certain multiplayer features are only available in a particular upgraded version of the game, then the purchasing user may be interested in knowing which version was purchased by his friends.

Through selection of a purchase option provided by display 300C, the selected version of the content item can be automatically added to the user's cart for checkout. That is, when the user selects an recommended version upgrade, the previous content item selection can be automatically replaced with the upgraded version in the user's cart. As such, the user can seamlessly proceed to checkout and payment for the upgraded version without the need to manually remove and/or replace the previously selected version of the content item.

Figure 4:
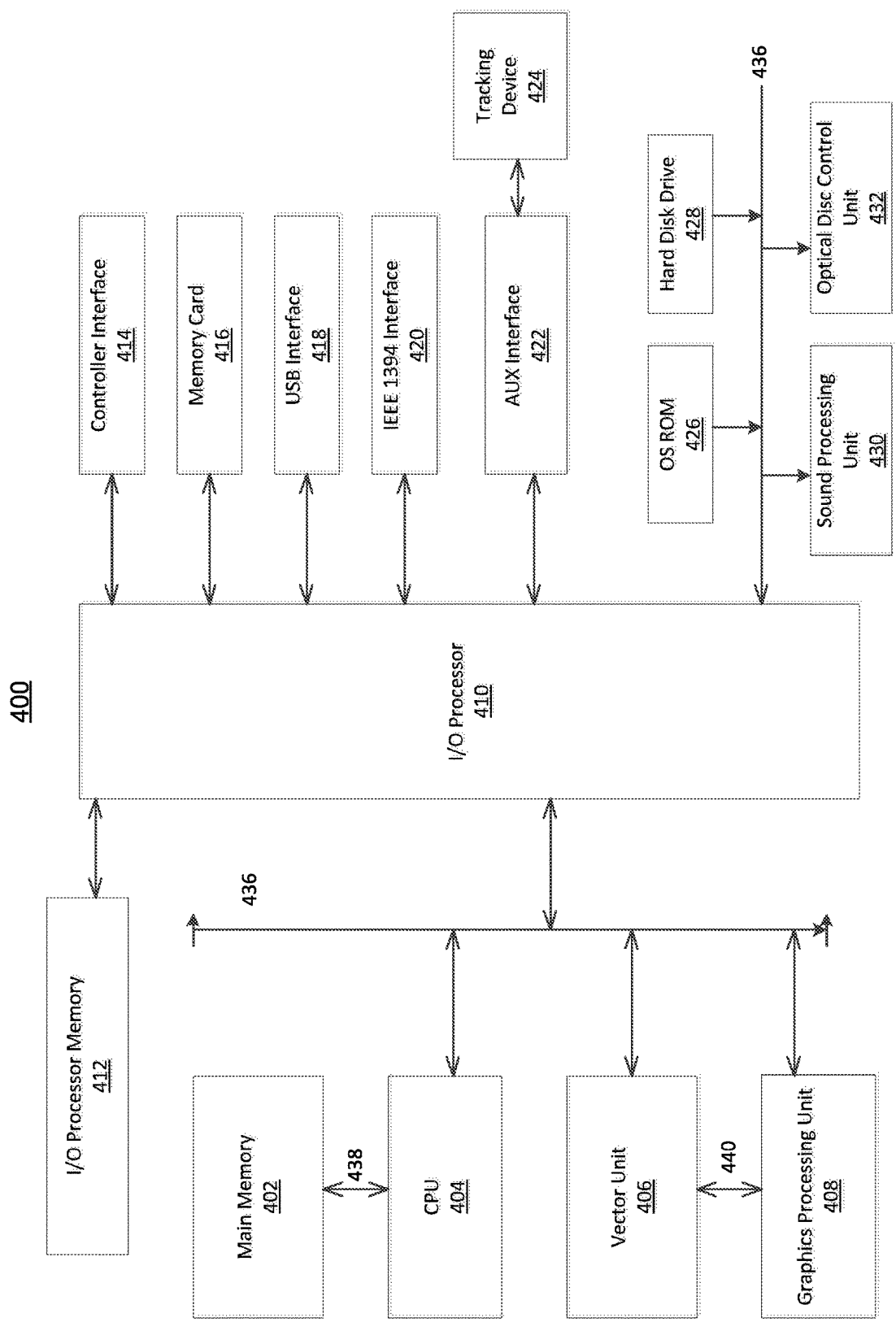
FIG. 4 illustrates an example of an electronic system with which some aspects of the subject technology can be implemented.

FIG. 4 illustrates an example of an electronic system with which some aspects of the subject technology can be implemented. In particular, FIG. 4 is an exemplary user device 400, such as a game console system, that the user can use to browse an online store to purchase and download various content items.

User device 400 can include various elements as illustrated in FIG. 4. It should be noted that the elements are exemplary and that other embodiments may incorporate more or less than the elements illustrated. With reference to FIG. 4, user device 400 includes a main memory 402, central processing unit (CPU) 404, at least one vector unit 406, graphics processing unit 408, input/output (I/O) processor 410, I/O processor memory 412, controller interface 414, memory card 416, Universal Serial Bus (USB) interface 418, IEEE 1394 interface 420, and an auxiliary (AUX) interface 422 for connecting a tracking device 424, although other bus standards and interfaces may be utilized. User device 400 further includes an operating system read-only memory (OS ROM) 426, a sound processing unit 428, an optical disc control unit 430, and a hard disc drive 432, which are connected via a bus 434 to the I/O processor 410. The user device 400 further includes at least one tracking device 424.

Tracking device 424 can be a camera, which includes eye-tracking capabilities. The camera may be integrated into or attached as a peripheral device to user device 400. In some eye-tracking device implementations, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates. Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 424 may include a microphone integrated into or attached as a peripheral device to user device 400 that captures voice data. The microphone may conduct acoustic source localization and/or ambient noise suppression.

Alternatively, tracking device 424 may be the controller of the user device 400. The controller may use a combination of built-in accelerometers and infrared detection to sense its position in 3D space when pointed at the LEDs in a sensor nearby, attached to, or integrated into the console of the entertainment system. This design allows users to control functionalities of the user device 400 with physical gestures as well as button-presses. The controller connects to the user device 400 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 400 may be an electronic gaming console. Alternatively, the user device 400 may be implemented as a general-purpose computer, a set-top box, or a hand-held gaming device. Further, similar user devices may contain more or less operating components.

CPU 404, vector unit 406, graphics processing unit 408, and I/O processor 410 communicate via system bus 436. Further, the CPU 404 communicates with the main memory 402 via a dedicated bus 438, while the vector unit 406 and the graphics processing unit 408 may communicate through a dedicated bus 440. The CPU 404 executes programs stored in the OS ROM 426 and the main memory 402. The main memory 402 may contain pre-stored programs and programs transferred through the I/O Processor 410 from a CD-ROM, DVD-ROM, or other optical disc (not shown) using the optical disc control unit 432. The I/O processor 410 primarily controls data exchanges between the various devices of the user device 400 including the CPU 404, the vector unit 406, the graphics processing unit 408, and the controller interface 414.

Graphics processing unit 408 executes graphics instructions received from the CPU 404 and the vector unit 406 to produce images for display on a display device (not shown). For example, the vector unit 406 may transform objects from three-dimensional coordinates to two-dimensional coordinates, and send the two-dimensional coordinates to the graphics processing unit 408. Furthermore, the sound processing unit 430 executes instructions to produce sound signals that are outputted to an audio device such as speakers (not shown).

A user of user device 400 provides instructions via controller interface 414 to CPU 404. For example, the user may instruct CPU 404 to store certain information on the memory card 416 or instruct user device 400 to perform some specified action.

Other devices may be connected to user device 400 via USB interface 418, IEEE 1394 interface 420, and AUX interface 422. Specifically, tracking device 424, including a camera or a sensor may be connected to user device 400 via AUX interface 422, while a controller may be connected via USB interface 418.

Figure 5:
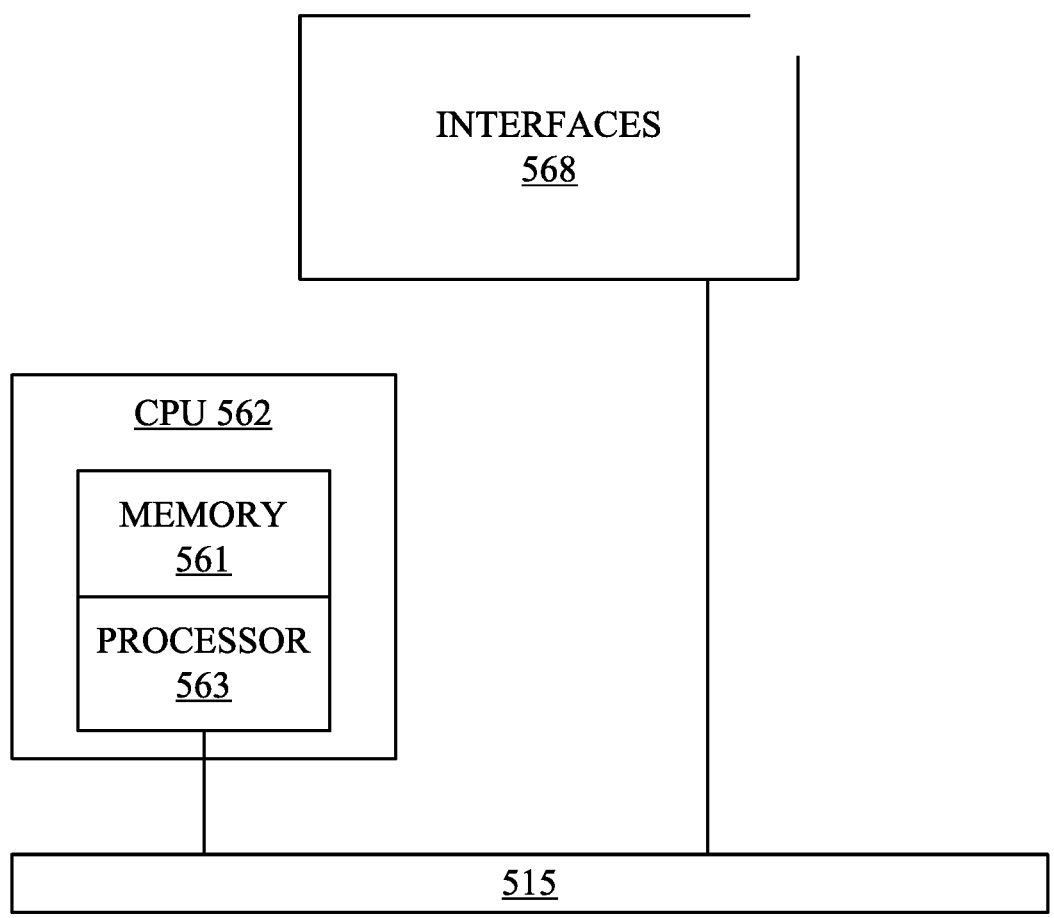
FIG. 5 illustrates an example of a network device that can be used to implement some aspects of the technology.

FIG. 5 illustrates an example network device 510 according to some embodiments. Network device 510 can be used to implement one or more servers or remote computing devices, such as media delivery system 104, discussed above with respect to FIG. 1. Network device 510 includes a master central processing unit (CPU) 562, interfaces 568, and a bus 515 (e.g., a PCI bus).

When acting under the control of appropriate software or firmware, CPU 562 is responsible for executing functions necessary for operation of an online content delivery platform. CPU 562 preferably accomplishes all these functions under the control of software including an operating system and any appropriate applications modules, such as cart 105A, product recommendation module 105B, and/or social analysis module 105C, discussed above. CPU 562 may include one or more processors 563 such as a processor from the Motorola family of microprocessors or the MIPS family of microprocessors. In an alternative embodiment, processor 563 is specially designed hardware for controlling the operations of device 510. In a specific embodiment, memory 561 (such as non-volatile RAM and/or ROM) also forms part of CPU 562. However, there are many different ways in which memory could be coupled to the system.

As discussed above, CPU 562 can be configured to execute instructions provided by one or more software modules, for example, to perform operations including: authenticating a user associated with a user device, identifying one or more affiliates of the user, wherein the one or more affiliates are associated with the user via a social network or online gaming platform, receiving, from the user device, a user selection of a content item, wherein the content item is associated with a first version identifier and a first price indicator, and in response to the user selection of the content item, placing the content item in an online shopping cart, and identifying an upgrade version of the content item, wherein the upgrade version is associated with a second version identifier and a second price indicator. In some aspects, CPU 562 can be further configured to perform operations for providing a recommendation to the user, wherein the recommendation indicates the upgrade version of the content item and the second price indicator.

Interfaces 568 are typically provided as interface cards (sometimes referred to as "line cards"). Generally, they control the sending and receiving of data packets over the network and sometimes support other peripherals used with the network device 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the configuration of network device 510, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for presenting content upgrade recommendations, the method comprising:
receiving a user selection of a first version of a content item from an online graphical display, the user selection sent over a communication network from a user device, the first version associated with a first version identifier;
identifying one or more other versions of the content item based on the first version identifier;
generating an interstitial graphical display that presents the other versions of the content item, wherein the interstitial graphical display includes a recommendation indicator for at least one of the other versions based on user information from one or more platform databases;
receiving input that selects one of the other versions from the interstitial graphical display; and
seamlessly updating an online cart display associated with the user device by replacing the first version with the version selected from the interstitial graphical display without requiring the user to remove the first version.

2. The method of claim 1, wherein providing the recommendation indicator is further based on historical data, and wherein the historical data includes at least one of browsing history, purchase history, play history, and affiliate history.

3. The method of claim 1, wherein the interstitial graphical display further includes a product comparison between the first version and the other versions, the product comparison indicating one or more differences in features of the first version and each of the other versions.

4. The method of claim 1, wherein the interstitial graphical display visually prioritizes a recommendation of the at least one version.

5. The method of claim 1, further comprising obtaining the user information from the platform databases over a communication network, wherein the platform databases include a plurality of different networking services.

6. The method of claim 5, wherein the user information includes affiliate data from the different networking services, and further comprising searching for historical data regarding one or more affiliates based on the affiliate data from the different networking services.

7. The method of claim 1, further comprising downloading the selected version of the content item included in the online cart display to the user device.

8. The method of claim 1, wherein providing the recommendation indicator is further based on the content item being associated with multiplayer play.

9. The method of claim 1, wherein providing the recommendation indicator is further based on access rights to one or more game environments of the content item.

10. The method of claim 1, wherein providing the recommendation indicator is further based on information regarding one or more other online users associated with the content item.

11. A system for profile generation for presenting content upgrade recommendations, the system comprising:
one or more processors;
a network interface coupled to the processors; and
a computer-readable medium coupled to the processors, the computer-readable medium comprising instructions stored therein, which when executed by the processors, cause the processors to perform operations comprising:
receiving a user selection of a first version of a content item from an online graphical display, the user selection sent over a communication network from a user device, the first version associated with a first version identifier;
identifying one or more other versions of the content item based on the first version identifier;
generating an interstitial graphical display that presents the other versions of the content item, wherein the interstitial graphical display includes a recommendation indicator for at least one of the other versions based on user information from one or more platform databases;
receiving input that selects one of the other versions from the interstitial graphical display; and
seamlessly updating an online cart display associated with the user device by replacing the first version with the version selected from the interstitial graphical display without requiring the user to remove the first version.

12. The system of claim 11, wherein the recommendation indicator is further based on historical data, and wherein the historical data includes at least one of browsing history, purchase history, play history, and affiliate history.

13. The system of claim 11, wherein the interstitial graphical display further includes a product comparison between the first version and the other versions, the product comparison indicating one or more differences in features of the first version and each of the other versions.

14. The system of claim 11, wherein the interstitial graphical display visually prioritizes a recommendation of the at least one version.

15. The system of claim 11, wherein the execution by the processor further obtains the user information from the platform databases over a communication network, wherein the platform databases include a plurality of different networking services.

16. The system of claim 15, wherein the user information includes affiliate data from the different networking services, and wherein the execution by the processor further searches for historical data regarding one or more affiliates based on the affiliate data from the different networking services.

17. The system of claim 11, wherein the execution by the processor further downloads the selected version of the content item included in the online cart display to the user device.

18. The system of claim 11, wherein the recommendation indicator is further based on the content item being associated with multiplayer play.

19. The system of claim 11, wherein the recommendation is further based on the one of the other versions being associated with access rights to one or more game environments.

20. The system of claim 11, wherein the recommendation indicator is further based on information regarding one or more other online users associated with the content item.

21. A non-transitory computer-readable storage medium, having embodied thereon a program executable by a processor to perform a method for presenting content upgrade recommendations, the method comprising:
receiving a user selection of a first version of a content item from an online graphical display, the user selection sent over a communication network from a user device, the first version associated with a first version identifier;

identifying one or more other versions of the content item based on the first version identifier;

generating an interstitial graphical display that presents the other versions of the content item, wherein the interstitial graphical display includes a recommendation indicator for at least one of the other versions based on user information from one or more platform databases;

receiving input that selects one of the other versions from the interstitial graphical display; and seamlessly updating an online cart display associated with the user device by replacing the first version with the version selected from the interstitial graphical display without requiring the user to remove the first version.

* * * * *